United States Patent [19]
Punj et al.

[11] Patent Number: 5,150,358
[45] Date of Patent: Sep. 22, 1992

[54] SERVING CONSTANT BIT RATE TRAFFIC IN A BROADBAND DATA SWITCH

[75] Inventors: Vikram Punj, Naperville, Ill.; Albert K. Wong, Edison, N.J.

[73] Assignee: AT&T Bell Laboratories, Murray Hill, N.J.

[21] Appl. No.: 571,800

[22] Filed: Aug. 23, 1990

[51] Int. Cl.[5] .............................................. H04J 3/22
[52] U.S. Cl. ...................................... 370/84; 370/60; 370/61; 370/85.6; 370/94.1
[58] Field of Search .................... 370/60, 61, 84, 85.6, 370/94.1

[56] References Cited

U.S. PATENT DOCUMENTS 5,014,265 5/1991 Hahne et al. .......................... 370/61

OTHER PUBLICATIONS

L. Kleinrock, "*Queueing Systems*", vol. 2, Computer Applications, 1976, pp. 126-135.
L. Kleinrock, "A Delay Dependent Queue Discipline", *Naval Research Logistics Quarterly*, 11, 1964, pp. 329-341.
"ATM Priority in the B-ISDN", Australia, CCITT, Study Group XVIII-Contribution No. D.140, Jun. 1989, Geneva, pp. 1-6.
"Project 802-Local & Metropolitan Area Networks", IEEE 802.6-89/45, Aug. 7, 1989, pp. 23-36.

*Primary Examiner*—Douglas W. Olms
*Assistant Examiner*—Russell W. Blum
*Attorney, Agent, or Firm*—W. Ulrich

[57] ABSTRACT

This invention relates to a method and apparatus for transmitting constant and variable bit rate traffic in a broadband ISDN switch. Data from constant bit rate sources such as television cameras is entered into a group of queues. Each member of the group for queuing data of a different band of bit rates. Data is transmitted from these queues with highest priority from the queue storing data of the highest band of bit rates. If the longest enqueued entity of data in one of the other queues has been enqueued for more than a prespecified period, its priority is increased. Analytic studies have shown that use of three queues for constant bit rate traffic and a fourth queue for variable bit rate traffic allows a high occupancy in the output channels to be maintained with a negligible number of data entities excessively delayed.

9 Claims, 4 Drawing Sheets

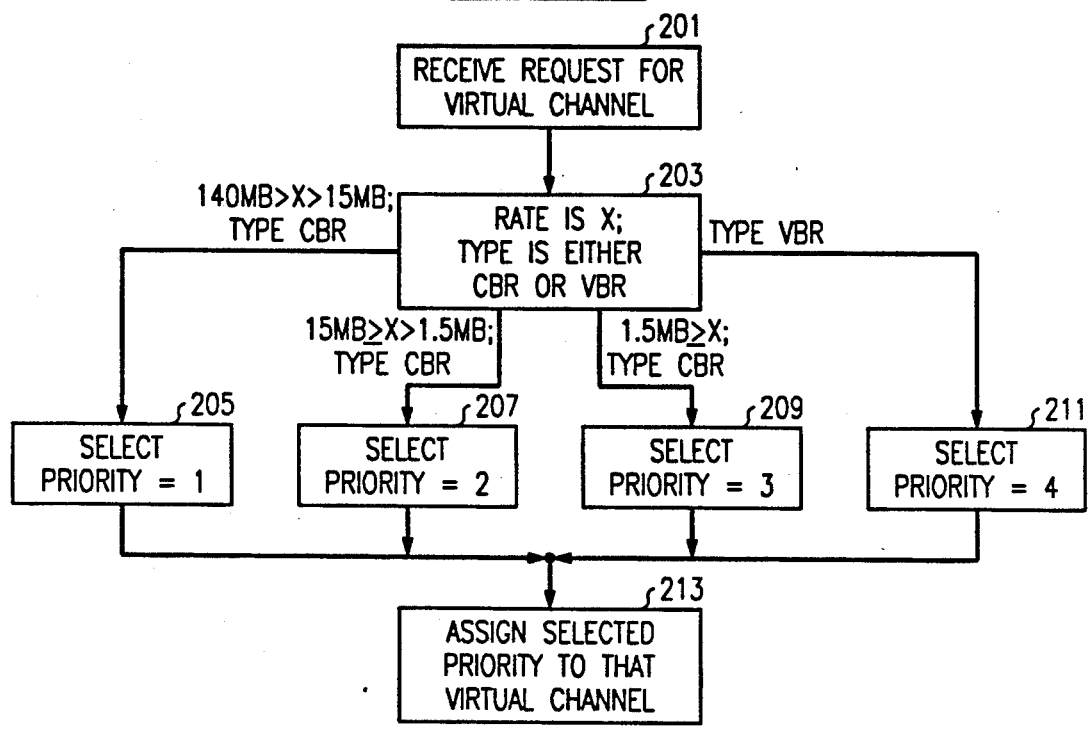
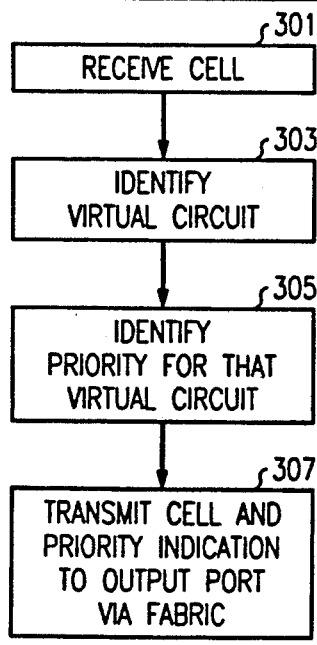

OUTPUT PORT RECEIVE PROCESS

INCREMENT QUEUED CELL AGE PROCESS

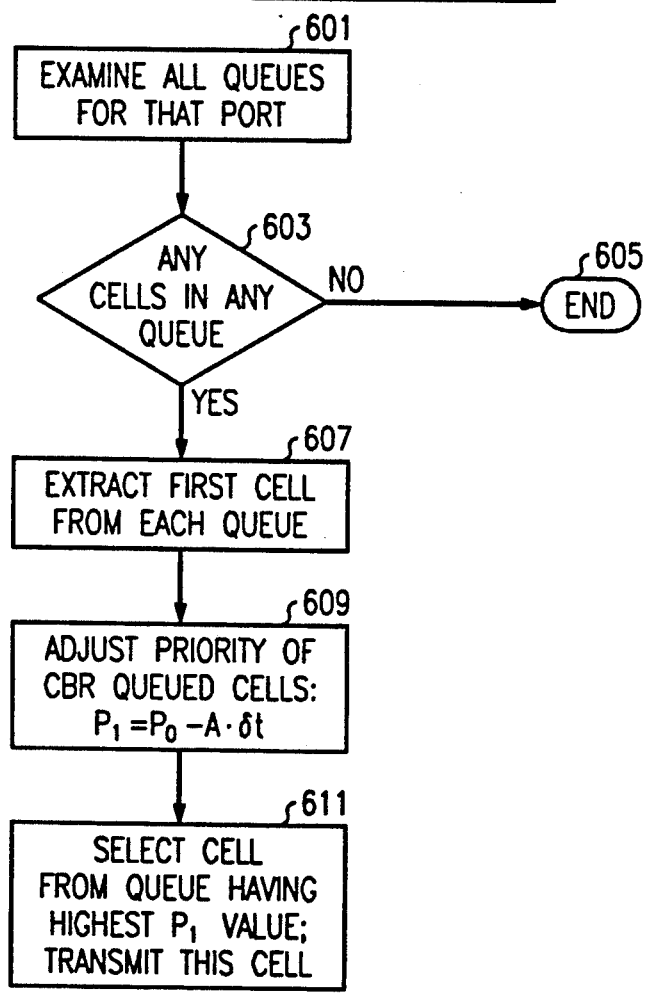

SERVING CONSTANT BIT RATE TRAFFIC IN A BROADBAND DATA SWITCH

TECHNICAL FIELD

This invention relates to a method and apparatus for switching constant bit rate and variable bit rate packetized traffic through a data switch.

PROBLEM

Telecommunications networks can be organized to set up circuit connections between end terminals or to set up connections such as packet switched connections. Such packet switched connections are capable of transmitting signals at a variable rate but can also be used for transmitting signals at a fixed rate. In many cases, it is advantageous to transmit both types of signals over the same facility since different terminals demand different types of service. Special packet switched networks capable of handling broadband signals have recently become available. One example is the broadband ISDN (BISDN) network specified in CCITT Study Group 18: Recommendations for Broadband Aspects of ISDN. BISDN uses for its basic data transport protocol, a layer 1 protocol called the Asynchronous Transfer Mode (ATM). In this mode, a series of cells are transmitted over the data transmission medium. Several cells are assembled into frames, each cell conveying 48 bytes of data and using 5 bytes of header information for routing. These cells then form the basic atomic unit for the transmission of signals within a broadband ISDN.

A large portion of the traffic that is served by a BISDN network is constant bit rate (CBR) traffic characterized by having a fixed rate of data transmission. One example of a terminal using CBR is an NTSC or HDTV video signal source. Such a source produces data at a constant rate. In order to have a transmission network capable of transmitting CBR data, such a network must be capable of delivering such data at a constant rate.

A problem arises in switching and transmitting such CBR traffic. The traffic sources are not synchronized with each other or with a standard clock within the system. Hence, the arrival time of cells from CBR sources is random. While a switch can provide some buffering to receive cells from a number of sources, the amount of buffering is limited and it is important to deliver the cells at a regular rate to outputs so that the receiving terminal receives a steady stream of data. Queuing delays resulting from contending cells, resulting from the random arrival of these cells give rise to variations in cell spacing which tends to become magnified as the cells traverse the network. The network processes cells from terminals which generate these cells at different bit rates over a wide range varying from 64 kilobits per second to 140 megabits per second. The problem is further compounded by the fact that a typical BISDN network is likely to transmit variable bit rate (VBR) traffic as well as the constant bit rate traffic. No satisfactory arrangement exists in the prior art for ensuring a very low probability of incurring excessive delay between two adjacent cells, or jitter, destined for a CBR virtual connection. Jitter may be reduced to zero by providing an arbitrarily large buildout delay at the destination CBR terminal. The amount of buffering required to accomplish this practically may be quite large depending upon the application and buffer management can also become complex.

SOLUTION

The above problem is solved and an advance is made over the prior art in accordance with our invention wherein we divide CBR traffic into an integral number of priority levels; then all traffic of the highest priority level is transmitted before any traffic of the next lower priority level which is transmitted before any traffic of the next lower priority level etc. Advantageously, such an arrangement allows the maximum delay incurred by the highest priority level to be limited to a smaller number than the delay incurred for a next lower priority level, etc. This solution also alleviates the problem of buffering in the CBR terminal.

In accordance with one specific embodiment of the invention, the highest priority levels are assigned to high bit rate CBR virtual channels and the lowest priority levels are assigned to low bit rate CBR virtual channels. This limits the size of the buffer required for the high bit rate terminals. In one specific embodiment, the priority levels are assigned to disjoint levels of the virtual CBR channel rates. Advantageously, this arrangement ensures lower delay for high bit rate CBR virtual channels.

A situation may occur wherein badly jittered high priority traffic monopolizes the interface causing lower priority, well-behaved traffic to lose its smooth traffic characteristic. In accordance with one aspect of the invention, the priority level of the next cell of a lower priority is given a priority adjustment based on its age in the queue or its age as the top cell in the queue. This improves performance and prevents high bit rate channels from "hogging" the physical channel thereby disrupting other lower priority traffic.

Analytic studies have shown that three priority levels may be effectively used, the highest for the range of 140 megabits to 15 megabits per second, a medium level of priority for 15 to 1.5 rate and a lowest level of priority for rates less than 1.5 megabits. Using these values, analytic studies for a network using 150 megabit physical channels have shown that a build-out delay in excess of 55 microseconds for the highest priority level virtual CBR channels, of 110 microseconds for medium priority virtual CBR channels, and 440 microseconds for lowest priority virtual CBR channels is almost never encountered. Specifically, the studies indicate that the probability of such a delay is about $N \times 10^{-15}$ where N is the number of switching nodes through which the cells of the virtual channel are transmitted. For higher bandwidth physical channels, the probability is even lower, and the build-out delay may be decreased.

BRIEF DESCRIPTION OF THE DRAWING

FIG. 2–6 are flowcharts of operations performed to switch data entities through the broadband ISDN node in conformance with the principles of this invention.

DETAILED DESCRIPTION

Figure 1:
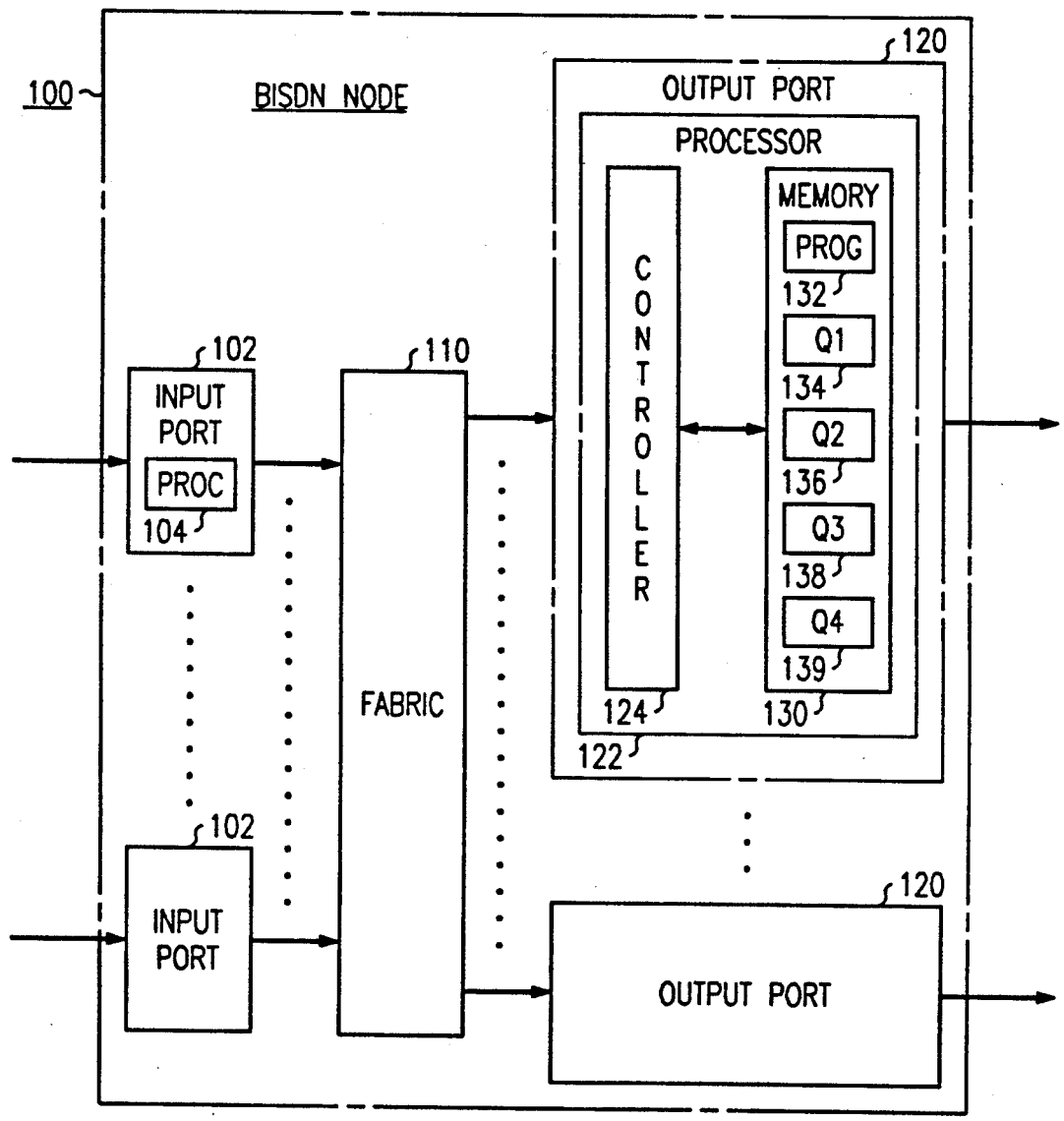
FIG. 1 illustrates a node of a broadband ISDN network.

FIG. 1 is a block diagram of a broadband ISDN node. It comprises a plurality of input ports 102, each of which has a processor 104. The input ports process input data to generate cells which are transmitted through an ATM switching fabric 110 to one of a plurality of output ports 120. Each output port has a processor 122 comprising a central processing unit 124 and memory 130. The memory is used for storing a program 132 and four queues: queue 1,134; queue 2,136, queue 3,138, and queue 4,139. Three of these queues are for CBR traffic, one for VBR traffic. These four queues are used to queue cells in order of priority and arrival time in accordance with the principles of this invention for transmission under the control of controller 124, operating under the control of program 132. Controller 124 is a control processing unit, a programmable logic array, or other controller.

FIG. 2 is a flow chart of the process for assigning priority to a virtual channel during call setup. The peak rate for a terminal of the exemplary system is 140 megabits per second (Mb/s). A request is received to set up a virtual channel (action block 201). The rate for this virtual channel is x and the type is constant bit rate or variable bit rate (action block 203). If the type is constant bit rate and x is no greater than 140 Mb/s but greater than 15 Mb/s, and the type is constant bit rate, then priority 1 is selected (action block 205). If x is no greater than 15 Mb/s but greater than 1.5 Mb/s and the type is constant bit rate, then priority 2 is selected (action block 207). If x is no greater than 1.5 Mb/s and this is a bit rate channel, then priority 3 is selected (action block 209). If this is a variable bit rate virtual channel, then priority 4 is selected (action block 211). The selected priority is assigned to that virtual channel (action block 213). In the specific embodiment which has been analytically studied, B is 15 megabits per second, and C is 1.5 megabits per second; 15 megabit channels and 1.5 megabits channels are treated as priority 1 and priority 2 channels, respectively. While in this specific embodiment, a single priority level is used for all VBR traffic, it may be desirable to use two or more levels to give higher priority to high speed VBR traffic.

FIG. 3 is a flow diagram of the pertinent parts of an input port receive process. A cell is received (action block 301). The virtual circuit of that cell is identified based on data in the cell (action block 303). The priority for that virtual circuit is then identified (action block 305) and the cell and a priority indicator is transmitted to the appropriate output port via the switching fabric (action block 307).

Figure 4:
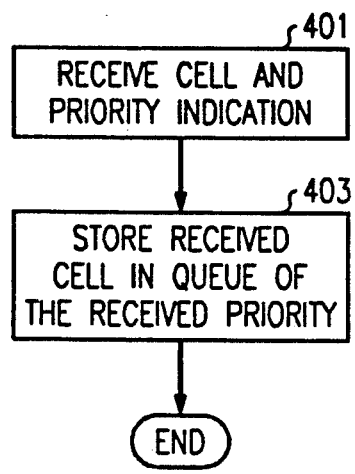

FIG. 4 is a flow diagram of an output port receive process. A cell and a priority indication is received in the output port (action block 401). The received cell is stored in the queue for that priority indication (action block 403).

Figure 5:
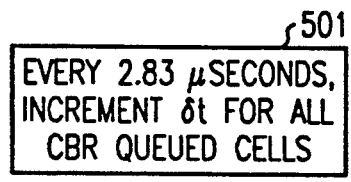

FIG. 5 is a flow diagram of a process which is used to increment the age count of the first cell in every queue once per cell time. Every 2.83 microseconds (the cell time in a 155.56 Mb/s BISDN interface) the count of time, $\delta T$, is incremented by one unit (action block 501) for all constant bit rate initial queued cells, i.e., the first cell in queues 134, 136, and 138. This is the process which allows cells in lower priority CBR queues to be transmitted if they have been waiting a sufficiently long time.

FIG. 6 is a flow diagram of an output port transmit process. All the queues (134, 136, 138, and 139) for that port are first examined (action block 601). Test 603 checks whether there are any cells in any queue. If not, the process ends (action block 605). If so, then the first cell from each non-empty queue is extracted (action block 607). The priority for this cell is adjusted by the formula $P1 = P0 - (A)(\delta T)$, where P0 is the priority of the queue, and the values P1 for the oldest entries in each of the queues are then examined (action block 609). The cell is then selected from the queue having the highest P1 value and this cell is transmitted (action block 611). The priority of the variable bit rate cell is not varied in this process. The result of performing the actions of FIG. 6 are that, in general, the cell from the highest priority queue having a cell is transmitted but for those cases in which the first cell in one of the other queues has been in that queue for a long time, that cell is then transmitted. This allows the engineered traffic of low priority queues to preserve its jitter characteristic. The value of A which has been selected based on analytic studies is 0 for the priority 1 and 4 queues, 0.1 for the priority 2 queue, and 0.01 for the priority 3 queue, and the value of $\delta T$ is one step per cell time (2.83 microseconds). Thus, for example, if a cell has been enqueued as the first cell in queue 2 for ten cell times, its priority is increased (i.e., its priority number is decreased) by one level.

The result of carrying out the actions of the flow charts of FIGS. 2–6 are that cells from high bit rate constant bit rate virtual channels are given priority over cells from lower bit rate constant bit rate channels which are in turn given priority over variable bit rate channels. Further, if a cell from a constant bit rate channel has been waiting in a queue for a sufficiently long time, its priority for transmission purposes is raised. If priority 1, 2, and 3 channels have 55, 110, and 440 microseconds of buffering, respectively, and no 150 megabit channel is loaded beyond 95% of capacity, then there is a very low probability (approximately N times $10^{-15}$ for an N node connection) encountering a delay that exceeds the buffering supplied for a channel.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of transmitting packetized data traffic from a number of sources having different bit rates comprising the steps of:
    entering data from sources having different bands of bit rates in different queues; and
    transmitting data from queues serving higher bit rate sources with higher priority than data from queues serving lower bit rate sources;
    wherein some of said sources generate constant bit rate data and others generate variable bit rate data, wherein separate queues are used for serving constant bit rate data sources and variable bit rate data sources and wherein said transmitting comprises transmitting data from queues serving constant bit rate sources with higher priority than data from queues serving bit rate sources.

2. Apparatus for transmitting packetized data from a plurality of sources having different bit rates comprising:
    a plurality of queues for storing entities of data, each queues for storing data from sources having a different band of bit rates;
    processor means operative under the control of a first program for controlling storage of data from each of said sources into one of said queues, said one queue for storing data of a band of bit rates including a bit rate of said each sources; and said processor means further operative under the control of a second program for controlling transmission of data stored in said queues, transmission of data from a queue for storing a first band of bit rates being given priority over transmission of data from a queue for storing a second band of bit first band has higher bit rates than said second band.

3. The apparatus of claim 2 wherein said plurality of queues comprises a plurality of queues for storing data from sources generating constant bit rate data, wherein said processor means are further operative under the control of said second program for controlling transmission of data stored in said queues for storing data from sources generating constant bit rate data with higher priority than data for queues storing data from sources generating variable bit data.

4. The apparatus of claim 2 wherein the priority of an oldest enqueued entity of data in a queue is increased if it has been enqueued for more than a predefined length of time for said queue.

5. The apparatus of claim 4 wherein a length of time that said oldest enqueued entity of data has been enqueued is measured only from a time that said entity has been an oldest entity in the queue.

6. A method of transmitting packetized data traffic from a number of constant bit rate sources having different bit rates, said bit rates divided into a plurality of disjoint bands of bit rates, and another number of variable bit rate sources, comprising the steps of:

entering data from constant bit rate sources in one of a plurality of first queues, each first queue for serving one of said different bands of bit rates;

entering data from variable bit rate sources in a second queue;

transmitting, data from a first queue serving a higher constant bit rate rate band, and wherein said second queue has lower priority than any of said first queues wherein the priority of an oldest enqueued entity of data in a queue is increased if it has been an oldest enqueued entity enqueued for more than a predefined time, and wherein transmitting comprises transmitting data from the queue with the highest priority having enqueued data to be transmitted.

7. The method of claim 6 wherein said first queues comprise three queues, one for storing data from constant bit rate sources generating data in excess of approximately 15 megabits per second, one for storing data from constant bit rate sources generating data at rates at or below approximately 1.5 megabits per second, and one for rates between approximately 1.5 and 15 megabits per second.

8. The method of claim 7 wherein said data entities are cells of an asynchronous transfer mode frame.

9. The method of claim 8 wherein an oldest enqueued cell of one of said first queues has its priority increased by one level when it has been an oldest enqueued cell for approximately one cell interval of a highest bit rate of a band of said one first queue.

* * * * *

UNITED STATES PATENT AND TRADEMARK OFFICE
CERTIFICATE OF CORRECTION

PATENT NO. : 5,150,358
DATED : September 22, 1992
INVENTOR(S) : Vikram Punj, Albert K. Wong It is certified that error appears in the above-identified patent and that said Letters Patent is hereby corrected as shown below:

Column 4, claim 2, line 68, delete "sources" and substitute --source--.

Column 5, claim 2, line 6, after "bit" insert --rates, wherein said--.

Column 6, claim 6, line 1, delete "one" and substitute --ones--.

Column 6, claim 6, line 7, after the first occurrence of "rate" insert --band with higher priority than data from a first queue serving a lower constant bit--.

Signed and Sealed this

Nineteenth Day of October, 1993

Attest:

BRUCE LEHMAN

Attesting Officer     Commissioner of Patents and Trademarks